(12) United States Patent
Stehling

(10) Patent No.: US 6,390,387 B1
(45) Date of Patent: May 21, 2002

(54) SHIELDED PLOT SPRAYER

(75) Inventor: Sammy J. Stehling, Monmouth, IL (US)

(73) Assignee: Monsanto Company, St. Louis, MO (US)

( * ) Notice: Subject to any disclaimer, the term of this patent is extended or adjusted under 35 U.S.C. 154(b) by 0 days.

(21) Appl. No.: 09/405,695

(22) Filed: Sep. 24, 1999

Related U.S. Application Data

(60) Provisional application No. 60/101,965, filed on Sep. 25, 1998.

(51) Int. Cl.$^7$ .............................. A01G 25/09; B05B 3/00
(52) U.S. Cl. ........................................ 239/172; 239/750
(58) Field of Search ................................. 239/170, 172, 239/175, 750, 751, 208, 209; 47/1.7, 17, 26, 28.1, 29

(56) References Cited

U.S. PATENT DOCUMENTS

| | | | |
|---|---|---|---|
| 657,966 A | 9/1900 | Stewart | 299/55 |
| 1,218,326 A | 3/1917 | Sheridan | 299/55 |
| 2,024,374 A | 12/1935 | Langebrake | 299/55 |
| 2,879,945 A | 3/1959 | Johnson | 239/185 |
| 3,228,144 A * | 1/1966 | Homan | 239/170 |
| 3,395,485 A * | 8/1968 | Rooklidge | 239/170 |
| 4,074,856 A | 2/1978 | Williams et al. | 239/1 |
| 4,521,988 A | 6/1985 | Thacker | 47/1.7 |
| 4,641,781 A * | 2/1987 | McCrea et al. | 239/172 |
| 4,763,440 A | 8/1988 | James | 47/2 |
| 4,842,204 A | 6/1989 | Debruhl | 239/744 |
| 4,865,628 A * | 9/1989 | Iwanczyk | 47/1.7 |
| 4,893,755 A * | 1/1990 | Keathley | 239/172 |
| 4,928,889 A | 5/1990 | Lucas | 239/751 |
| RE33,746 E * | 11/1991 | Lucas | 239/744 |
| 5,155,933 A | 10/1992 | Claussen et al. | 47/1.7 |
| 5,248,090 A | 9/1993 | Williamson | 239/168 |
| 5,355,618 A * | 10/1994 | Pedersen | 47/18 |
| 5,371,969 A | 12/1994 | Claussen et al. | 47/1.7 |

FOREIGN PATENT DOCUMENTS

| | | | | |
|---|---|---|---|---|
| GB | 2 273 028 | | 6/1994 | ............ A01M/7/00 |
| WO | WO 82/00421 | * | 2/1982 | ................ 239/170 |

* cited by examiner

*Primary Examiner*—William C. Doerrler
*Assistant Examiner*—Davis Hwu
(74) *Attorney, Agent, or Firm*—Senniger, Powers, Leavitt & Roedel; Joseph A. Schaper

(57) ABSTRACT

A mobile shielded plot sprayer including a wind shield having a side wall that defines an enclosed area, and a movable atomizer within the enclosed area. A track assembly is located within the enclosed area and supported on the windshield. The atomizer is part of a spray assembly mounted on the track assembly and is movable thereon in at least one horizontal direction relative to the wind shield. A reservoir integral with the spray assembly and adapted to hold a liquid spray composition is operatively connected to the atomizer to supply the spray composition thereto.

34 Claims, 12 Drawing Sheets

SHIELDED PLOT SPRAYER

This Application claims the benefit of U.S. provisional application Serial No. 60/101,965 filed Sep. 25, 1998.

FIELD OF THE INVENTION

This invention generally relates to agricultural field spraying equipment, and more particularly to a plot sprayer useful in field research relating to biological effectiveness of agricultural chemicals on crops and weeds.

BACKGROUND OF THE INVENTION

Agricultural chemicals, including pesticides, plant growth regulators, foliar fertilizers, desiccants and the like, are typically applied to plants or soil by spraying using various types and designs of mobile spraying equipment. The agricultural chemicals are normally diluted, dissolved or dispersed in a suitable liquid carrier, most commonly water, to form a composition that is suitable for spraying and is referred to herein as a "spray composition". The application rate of a sprayed chemical can be metered by controlling four factors: the rate of travel of the spraying equipment over the ground, the rate at which the spray solution is dispensed, the width of the swath being sprayed, and the concentration of the chemical in the spray solution.

Rate of travel of the spraying equipment, expressed, for example, in meters per second (m/s), is dictated by forward speed, during spraying, whether motion is imparted by human power, as in the case of hand-held or backpack-mounted spraying equipment, or by mechanical power, as in the case of tractor-mounted spray equipment or purpose-built motorized spray rigs.

Rate of dispensing, or output, of the spray solution, expressed, for example, in liters per second (l/s), is dictated by several factors: the number of simultaneously operating spray nozzles, the configuration, in particular the size, of the orifice of each nozzle, the propulsion force applied (normally provided by hydraulic pressure), and the rheological properties of the spray solution, especially its viscosity. The term "nozzle" in the present context is to be understood to apply to any atomization means having the function of a nozzle. Similarly, the term "orifice" in the present context is to be understood to apply to the feature or part of any atomization means having the same function as the orifice of a nozzle.

Spray swath width, expressed, for example, in meters (m), is dictated by the number of nozzles arranged on a boom disposed perpendicularly to the direction of travel of the spray equipment, the distance between nozzles, the angular width of the conical or fan-shaped spray pattern generated by the orifice of each nozzle, the degree of overlap of adjacent spray patterns, and the height of the nozzles above the ground or plant target.

Concentration of the chemical in the spray solution, expressed for example in grams/liter (g/l), is controlled by the operator during preparation of the spray solution, most commonly by mixing a measured amount of a concentrate formulation having a known concentration of the chemical in a measured volume of water.

Chemical application rate is the product of the above parameters and can be expressed as $$R = OC/TW$$

where R is chemical application rate, O is spray solution output, C is concentration of chemical in the spray solution, T is speed of forward travel and W is swath width. When T is expressed in m/s, W in m, O in l/s and C in g/l, R is given in grams per square meter (g/m²).

Modern spray equipment can generally be fairly precisely calibrated with respect to the above parameters to deliver a desired chemical application rate. Under ideal weather conditions, such calibration leads to an actual application rate which is more or less constant and reproducible and which varies little (typically +/–10% or less) from the desired rate.

However, weather conditions are seldom ideal. In particular, wind, even a light wind, disturbs the spray pattern sufficiently to compromise accuracy and precision of a well calibrated sprayer. When wind speed and direction vary constantly, a condition known as turbulence, this problem is still more acute. Turbulent air movement frequently occurs near ground level even when air movement a few meters above ground is non-turbulent. This turbulence is often further aggravated by motion of the spray equipment.

An additional source of variation in application rate, even when a sprayer is perfectly calibrated, is vertical movement or oscillation of the spray boom or nozzle caused by travel over an irregular ground surface by a wheeled vehicle carrying the spraying equipment. Such vertical movement can be a problem also with hand-held spray equipment even when operated by an experienced technician walking on level ground. As the spray boom or nozzle is raised or lowered, spray swath width and the degree of overlap of adjacent spray patterns vary, resulting in irregularities in deposition of the spray composition.

Yet another problem is disturbance of soil or plants immediately before, during or immediately after spraying by the moving wheels of a vehicle or the walking feet of an operator carrying the spraying equipment. Such disturbance can take the form, for example, of local compaction of the surface layers of soil, leading to variation in the effectiveness of soil-applied chemicals. Disturbance of plants can affect their biological response to an applied chemical as well as result in accidental transfer of an applied chemical to other plants.

A particularly high degree of accuracy, precision and reproducibility is required when the chemical application is for research purposes. Agricultural researchers must be able to precisely evaluate the effects of particular rates of a chemical on crop and/or weed plants occupying a particular area of a field demarcated for such evaluation. Such a demarcated area is referred to herein as a plot. Typically, researchers compare the performance of plants in a sprayed plot to that in a nearby or adjacent unsprayed control plot. Generally, several different chemical treatments are compared, each treatment being applied to a different plot. It is important, therefore, that the chemical is precisely dispensed only on the intended plot, and uniformly within that plot, with little or no wind-assisted drift of the spray solution on to adjacent plots.

The occurrence of wind is, in most climates, very frequent. If spraying has to be restricted to periods of relative calm, the number of plots that can be sprayed in a season is limited. Research productivity suffers as spray operators are often unable to apply chemicals at the optimum time, because of windy weather. Thus, a need exists in the art for a spraying apparatus which is able to accurately dispense a chemical within a plot with minimum effects from wind and turbulence. Such an apparatus would greatly improve research productivity as well as accuracy.

As spraying can seldom wait until conditions are absolutely calm, researchers have to some extent adapted their procedures to allow for at least a light wind. For example, it is common to leave buffer strips between plots to avoid wind-assisted drift from one plot contaminating adjacent plots. The need for buffer strips increases the amount of land needed for field testing of agricultural chemicals, or reduces the number of treatments that can be accommodated in a single experiment. As the experimental area becomes larger, variability in soil and plant conditions increases, tending to reduce the precision of the experiment. A further benefit of a windproof spraying apparatus would therefore be to reduce the amount of land required for a field experiment and thereby to improve the precision of such an experiment.

Previous attempts to provide spraying equipment with wind protection have involved partially or totally surrounding a spray boom, or individual spray nozzles on a boom, with a shield or skirt which is carried on the boom. Shielded sprayers of this type do reduce wind-assisted drift of spray solution, and can also be used to protect plants sensitive to a chemical from spray application of the chemical close to such plants (for example, in selective application of a herbicide to weeds between the rows of a crop). However, a new problem is introduced which is of particular relevance in research plots. The shield or skirt tends to become coated with the chemical and transfers chemical to plants as it passes over them. Further, the spray solution drips from the bottom edge of the shield or skirt. In these and other ways, shielded sprayers of prior art contribute to inaccuracy of application.

There is a long-standing need for improved spraying apparatus that can precisely apply an agricultural chemical treatment to a plot in variable wind conditions, and that minimizes the need for buffer strips between plots. An improved spraying apparatus that meets this need, and at the same time eliminates vertical movement or oscillation of the spray boom or nozzle would be a particularly useful advance in the art. An improved spraying apparatus that has these benefits, and that in operation causes no disturbance of soil or plants other than the direct effects of spraying, would be an even more useful advance in the art. It is just such an improved spraying apparatus that is now provided.

SUMMARY OF THE INVENTION

The present invention relates to a spray apparatus for spraying a plot of land with a liquid spray composition. The spray apparatus is readily relocatable without disassembly and comprises (1) a rigid frame; (2) a wind shield, supported on or integral with the frame, comprising a side wall that defines an enclosed area and has a top edge that is preferably substantially horizontal and is located at a suitable height; (3) a track assembly located within the enclosed area and supported on the frame; (4) a spray assembly mounted on the track assembly and movable thereon in at least one horizontal direction relative to the wind shield, the spray assembly comprising atomizing means located at a height lower than any substantial part of the top edge of the side wall; (5) a permanent or replaceable reservoir external to or integral with the spray assembly, adapted to hold a liquid spray composition and operatively connected to the atomizing means to supply the spray composition thereto; (6) means for transmission of power to the spray assembly for movement thereof on the track assembly; (7) drive control means, to permit operator control of said movement of the spray assembly; (8) fluid propulsion means, i.e., means for causing the spray composition to flow from the reservoir through the atomizing means, to effect spraying; (9) flow control means, to permit operator control of spraying; and (10) means for moving the apparatus vertically and horizontally, such that the apparatus is readily relocatable without disassembly.

By “readily relocatable” it is meant that the entire apparatus can be transported laterally from one plot to another in a field by a small number of persons acting together, or with the aid of conventional farm machinery. The frame is of such construction, and the other components of the apparatus are disposed with respect to the frame in such a manner, as to permit easy relocation of the entire apparatus without disassembly. Means for moving the apparatus vertically and horizontally can take a number of forms. For example, the frame can be provided with optionally retractable wheels, to enable the apparatus to be moved laterally from one plot to another. Preferably, however, the frame is provided with lifting means, to facilitate raising of the entire apparatus off the ground at the location of a first plot, transporting of the apparatus to the location of a second plot, and lowering of the apparatus on to the ground at the location of the second plot. Such lifting means can be, for example, a plurality of handles to permit raising, transporting and lowering by two or more persons. In preferred embodiments, the lifting means are hitching means, by which the apparatus can be hitched to a tractor or other powered vehicle capable of raising, transporting and lowering the apparatus. Such hitching means typically comprise a plurality of hitching points and can be adapted, for example, for connection to a conventional tractor-mounted three-point hitch or fork-lift device.

The side wall of the wind shield preferably comprises four substantially rectangular side panels that are substantially vertical and are connected to each other at approximately 90° angles. The side panels can be of substantially equal length so as to define a square enclosed area; however for most applications it is preferred that there be a longer pair and a shorter pair of opposing side panels, thereby defining a substantially rectangular enclosed area. The wind shield preferably further comprises a substantially horizontal, square or rectangular top canopy which is connected to the side wall, for example at or close to the top edge thereof, so as to leave substantially no gaps between the top canopy and the side panels.

In one embodiment the side panels, and optionally the top canopy, are of rigid construction and have sufficient mechanical strength and rigidity to serve both as the wind shield and as the frame. In this embodiment, therefore, the wind shield is integral with the frame. However, for most purposes it is preferred that the wind shield and frame are not integral, and that. the side panels and top canopy are constructed of a lightweight material attached directly to the frame. It is especially preferred that this material be transparent, to permit operation of the spray assembly within the enclosed area to be visually monitored by a person standing outside the wind shield.

It is also preferred that at least one of the side panels or the top canopy be provided with an aperture large enough to permit insertion, removal or servicing of a reservoir. This aperture facilitates replacement or refilling of the reservoir after a plot has been sprayed and the spray apparatus has been, or is about to be, moved to another plot.

The track assembly, in one embodiment of the invention, comprises a single fixed horizontal track, typically oriented parallel to the longer pair of side panels and midway between them. On such a track the spray assembly is movable in one direction only. In another embodiment of the invention, the track assembly comprises a first track mounted fixedly on the rigid frame and a second track mounted movably on the first track, both of these tracks being located within the enclosed area. The first and second tracks are oriented perpendicularly to each other, the first track being typically oriented parallel to the longer pair of side panels and midway between them. In this embodiment, the spray assembly is movably mounted on the second track. The first and second tracks are movably connected by a carriage. This arrangement allows the spray assembly to be moved across a plot in any desired pattern, for example in a scan pattern that includes a series of parallel passes.

The spray assembly comprises atomizing means which is preferably a hydraulic nozzle or a plurality of such nozzles. In an embodiment of the invention having a single fixed track on which the spray assembly is mounted, a preferred spray assembly comprises a boom oriented perpendicularly to the track, with a plurality of nozzles mounted at substantially regular intervals along the boom. The boom supports the nozzles and forms or carries a portion of a conduit through which a liquid spray composition can flow from the reservoir to all of the nozzles.

In a particularly preferred embodiment having only one nozzle, the spray assembly is movable horizontally in a first direction and a second direction perpendicular to the first direction so as to be capable of uniformly spraying the entire enclosed area. This is preferably accomplished using a track assembly comprising two perpendicular tracks as described above, wherein the second track is mounted movably on the first track and the spray assembly is mounted movably on the second track. Most preferably in this embodiment, the reservoir is integral with the spray assembly, i.e., is part of the spray assembly itself rather than being located elsewhere in the apparatus, and is connected to the nozzle by a rigid coupling piece having an internal conduit through which the spray composition is fed from the reservoir to the nozzle. This coupling piece can incorporate a quick-release coupling to permit easy replacement of the reservoir with minimal spillage of unused spray composition.

Drive means to cause the spray assembly to move on the track assembly (including, in an embodiment with two perpendicular tracks, drive means to cause the carriage carrying the second track to move on the first track) can be internal to the spray apparatus but is preferably external, the spray apparatus itself having an operative connection to such external drive means. For example, the external drive means can comprise an electric power generator and the operative connection can comprise a power cable that leads to an electric motor forming part of the track assembly and providing motive force to propel the spray assembly. As another example, the external drive means can comprise a source of hydraulic power and the operative connection can comprise a system of pipes providing hydraulic pressure to propel the spray assembly. In the embodiment described above wherein the track assembly comprises perpendicular first and second tracks movably connected by a carriage, an operative connection to drive means is provided both to the carriage, permitting movement of the second track on the first track, and to the spray assembly, permitting its movement on the second track.

Drive control means can comprise electrical switches and/or hydraulic valves, operatively connected to a control panel. The drive control means can be automated to varying degrees; in a preferred embodiment all aspects of motion and operation of the spray assembly, including spraying, are programmably controlled by a computer.

Fluid propulsion means, to cause the liquid spray composition to flow from the reservoir through the atomizing means, can be internal to the spray apparatus or external thereto. Flow can occur by gravity feed, for example to a spinning disk atomizer which draws the spray composition through at a constant rate, controllable by the speed of rotation of the spinning disk. Electrical power to drive a spinning disk can be provided from an external source (e.g., a generator) or a source located within the apparatus (e.g., a battery pack). Preferably, however, the fluid propulsion means is hydraulic pressure provided by pressurized gas, in which case the preferred atomizing means is a hydraulic nozzle or plurality of such nozzles. Pressurized gas, for example carbon dioxide, nitrogen, air or propane, can be supplied from a bottle. Alternatively, it can be supplied directly from a compressor. In either case the pressurized gas is supplied to the reservoir by an airline running from the source of pressurized gas to the reservoir. The term "airline" as used herein means a conduit for pressurized gas not restricted to compressed air.

Flow control means typically comprises one or more valves in the airline and/or in a conduit through which the spray composition flows from the reservoir to the atomizing means. Such valves can be designed for manual operation or can be computer controlled. In the embodiment described above wherein the track assembly comprises perpendicular first and second tracks movably connected by a carriage, the flow control means can be configured to cause spraying to occur when the spray assembly is in motion in a first direction parallel to the first track, and to prevent spraying when the spray assembly is stationary or in motion in a second direction parallel to the second track.

The present invention also relates to a process for spraying a plot using a spray apparatus as described herein. This process comprises the steps of (1) positioning the apparatus in a field such that the enclosed area defined by the wind shield covers the plot; (2) adding a suitable quantity of a spray composition to a permanent reservoir, or coupling a replaceable reservoir containing a spray composition to a spray assembly adapted to receive such a replaceable reservoir; and thereafter (3) operating, or causing a computer control system to operate, a switch or plurality of switches to cause the spray assembly to move in a predetermined pattern across the plot and to spray the spray composition uniformly over the entire plot. Steps (1) and (2) of this process can be carried out in either order.

The spray apparatus of the invention is particularly adapted for consecutively spraying a plurality of plots, for example in implementation of an agricultural chemical field trial. Accordingly, a process is provided for consecutively spraying a plurality of plots using a spray apparatus as described herein, comprising carrying out steps (1), (2) and (3) as described above; followed by (4) releasing unused spray composition from a permanent reservoir and rinsing the reservoir, or uncoupling a replaceable reservoir from the spray assembly; and (5) repeating steps (1) to (4) with further spray compositions on second and subsequent plots until all plots have been sprayed.

The present invention overcomes the problems of prior art sprayers by providing an easily relocatable, lightweight enclosure which is stationary during operation and a spray assembly for spraying a liquid spray composition within the area defined by the enclosure, which can correspond to the area of a plot. The apparatus of the present invention provides more accurate application of spray compositions to plots, and more uniform application across a single plot than prior spray equipment. The improved accuracy and uniformity can result from elimination of wind and turbulence, or from absence of vertical movement or oscillation of the spray assembly, or both. The apparatus also eliminates disturbance of soil or plants within plots by wheel-tracking or trampling. The present invention in one embodiment also permits rapid application of numerous spray compositions consecutively to different plots, without the risk of contamination of one spray composition by remnants of a previously applied spray composition in the apparatus. Because of these and other advantages, agricultural researchers can apply spray compositions to test plots more rapidly and accurately than in the past, and this can improve the speed, accuracy and productivity of their research.

DESCRIPTION OF ILLUSTRATIVE EMBODIMENTS

The present invention provides a field plot spraying apparatus that is particularly suited for agricultural research purposes. The apparatus includes a wind shield which during spraying is stationary relative to a plot of land, and provides an enclosed area around that plot, and a spray assembly that moves within the enclosed area and relative to the wind shield so that a liquid spray composition can be applied to all or part of the plot. The wind shield is mounted on a rigid frame and the whole apparatus is readily relocatable from one plot to another without disassembly.

Figure 1:
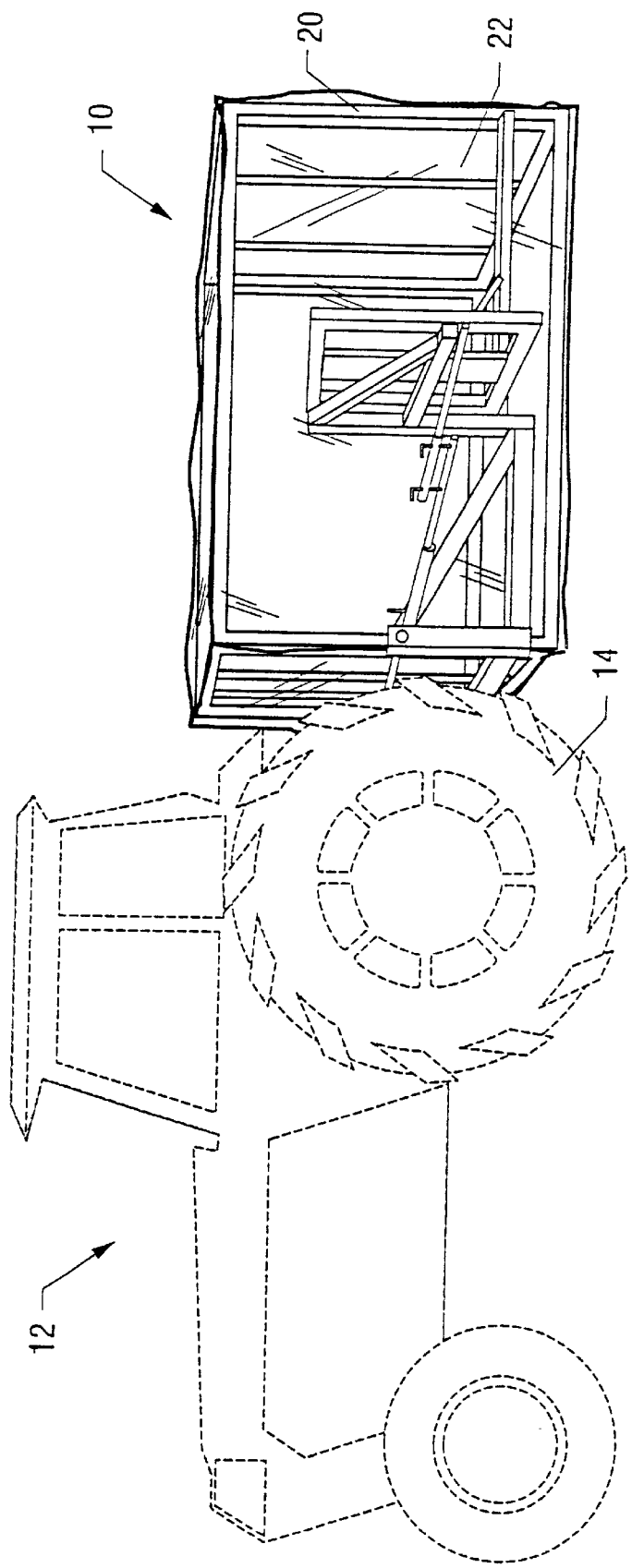
FIG. 1 is a side elevational view of a spray apparatus according to the invention, mounted illustratively on a farm tractor.
Figure 2:
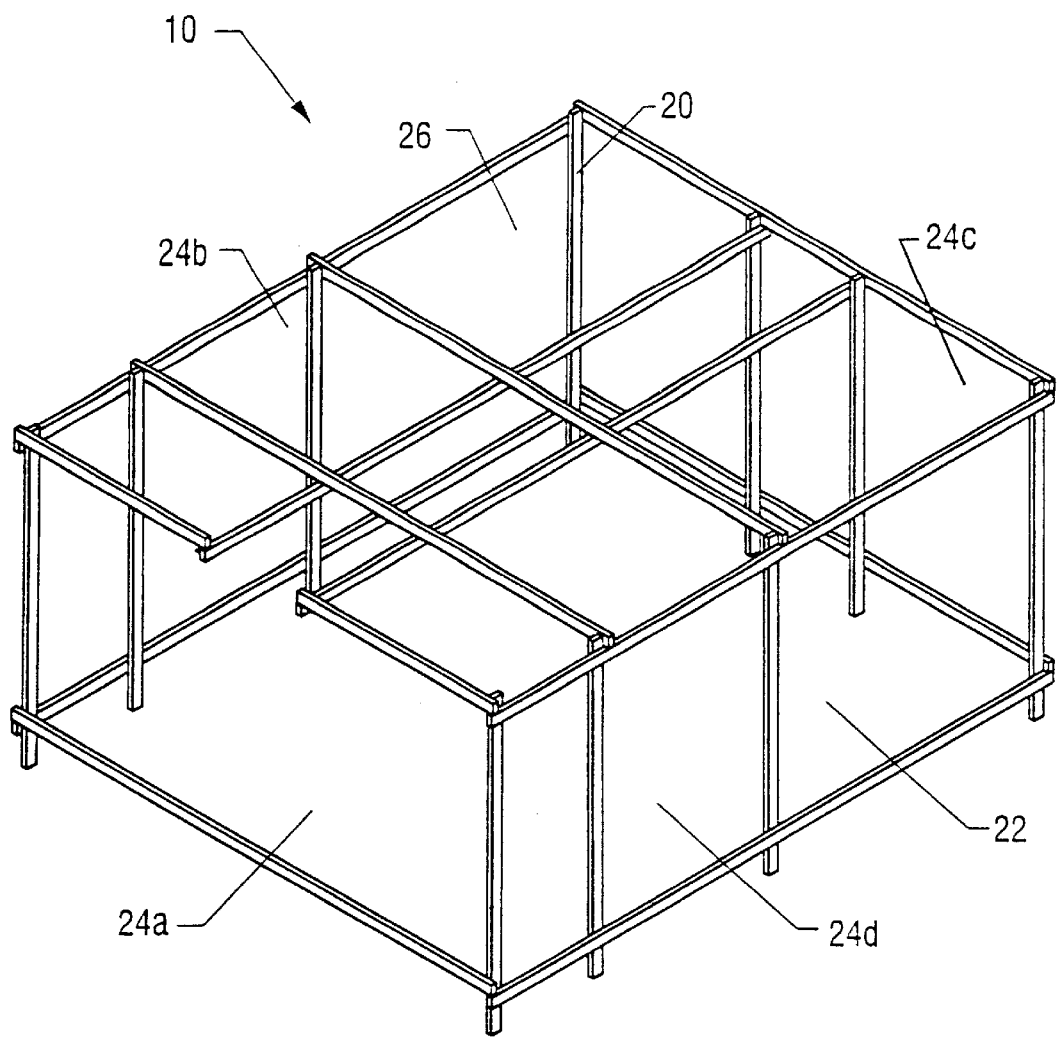
FIG. 2 is a perspective view of a wind shield in accordance with the invention.

One embodiment of the wind shield and frame is shown in FIG. 1. The wind shield 22 is attached to and substantially covers the frame 20 which is capable of supporting the entire weight of the apparatus. The frame can be hitched to a vehicle such as a farm tractor 12 by means, for example, of a standard three-point hitch (obscured in FIG. 1 by the rear tire 14 of the tractor). The three-point hitch can be used to lift the apparatus off the ground and hold it in an elevated position while the tractor drives to a different location, carrying the apparatus along with it. When the tractor arrives at the new location, the apparatus can be lowered, again by means of the three-point hitch, so that bottom horizontal members 34*a*–34*d* of the frame 20 rest on the ground. Although the apparatus of the present invention could be used for spraying while the bottom horizontal members 34*a*–34*d* are lifted off the ground, it is preferred to spray with the lower edge of the wind shield 22, which in this embodiment is contiguous with the bottom horizontal members 34*a*–34*d* of the frame 20, touching the ground in order to minimize wind-induced distortion of spray patterns.

The apparatus could be moved by other means, such as a fork lift, or manual lifting by several people. However, it will usually be most efficient to lift, lower, and move the wind shield with a farm tractor as in FIG. 1 or a functionally equivalent vehicle such as a truck. The tractor can also provide electrical or hydraulic power for moving the spray assembly (described below) within the enclosure defined by the wind shield, and/or for compressing gas to pressurize the reservoir containing the liquid composition to be sprayed.

The wind shield 22, shown without the tractor in FIG. 2, is preferably constructed of a flexible material securely attached to the frame 20. The wind shield 22 of FIG. 2 has a side wall comprising four side panels 24*a*–24*d* and a top canopy 26. The side panels 24*a*–24*d* and the top canopy 26 are preferably rectangular and joined to each other at 90° angles. The side panels 24*a*–24*d* and top canopy 26 define an enclosed area. The horizontal dimensions of the area enclosed by the wind shield 22 are preferably either equal to the size of the plot to be sprayed or somewhat larger than the plot in order to allow a buffer zone at the edges of the enclosed area.

Horizontal dimensions of the enclosed area, and hence of a plot for which the apparatus is a useful spraying device, are not narrowly limited. For example, an enclosed area having length and breadth each of about 1 to about 10 m can readily be provided. Illustratively, a length of about 5 m and breadth of about 2.5 m have been found to be convenient. Height of the top canopy, or of the top edge of the side panels in the absence of a top canopy, is likewise not narrowly limited, the primary requirement being that the spray apparatus can be accommodated such that the atomizing means is at a suitable height for spraying while at the same time no higher than the top edge of the side panels. Where a top canopy is present, the entire spray assembly is typically below the top canopy. These considerations normally dictate a minimum height above ground (when the apparatus is in position for spraying) of the top canopy or of the top edge of the side panels of about 0.5 m, but for most applications a minimum height of about 1 m is more appropriate. Apparatus of the invention can be purpose-designed for a wide variety of situations, including for use in tall-growing crops or other vegetation, thus the top canopy or the top edge of the side panels can be up to about 3 m, or even more, above ground. For use on bare soil or low-growing crops or weeds, it is more convenient for the height of the top canopy or the top edge of the side panels to be no more than about 2 m.

The frame 20 is rigid and preferably made of a lightweight material such as aluminum or fiberglass. The frame can comprise a plurality of individual structural members that are rigidly connected, for example by bolts or welds. Suitable materials for the wind shield 22 include canvas, woven polypropylene and polyethylene film. It is preferred for this material to be transparent in order to allow observers to visually monitor the spray operation within the enclosed area defined by the wind shield.

It will be appreciated that since the spraying apparatus is designed to be frequently moved to different plot areas, it needs to be anchored to the ground only sufficiently to prevent toppling or dislodgement by wind or other lateral forces. It will also be appreciated that many different anchoring methods can be employed, including relying on the weight of the apparatus itself in low wind conditions. In high wind conditions, supplemental weights could be hung on the frame 20, or anchoring pegs could be driven into the ground and the frame 20 secured to such pegs.

Figure 6:
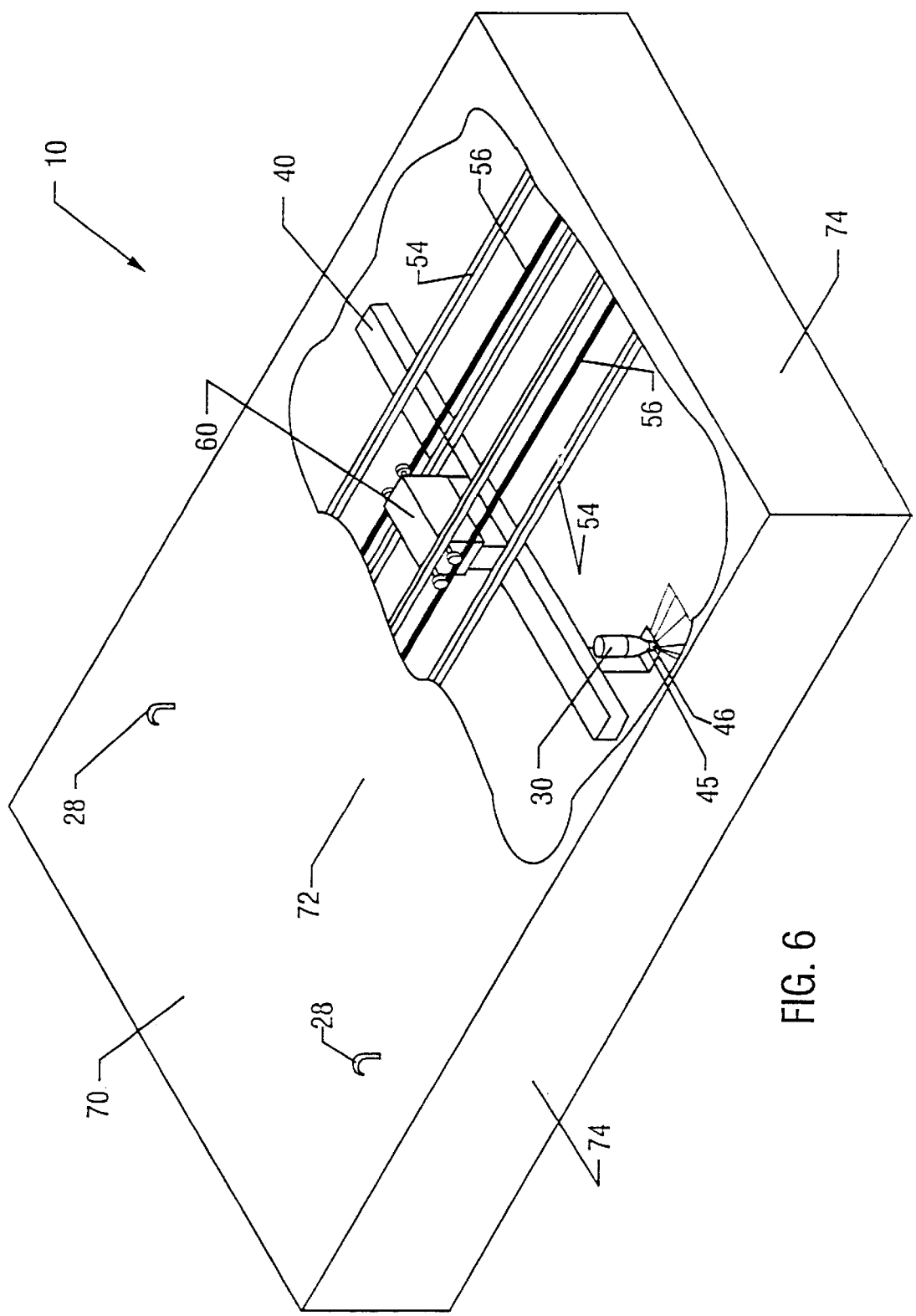
FIG. 6 is a cutaway perspective view of an alternative embodiment of a spray apparatus having a wind shield that serves also as a rigid frame in accordance with the invention.

In another embodiment of the invention, a wind shield 10 is provided in the form of a rigid four-sided box, as shown in FIG. 6, in which case the wind shield can function also as the frame on which other parts of the apparatus are supported and to which a tractor or other vehicle can be hitched. In this embodiment, the wind shield 10 can suitably include rigid side panels 74 and a rigid top canopy 72.

Figure 3:
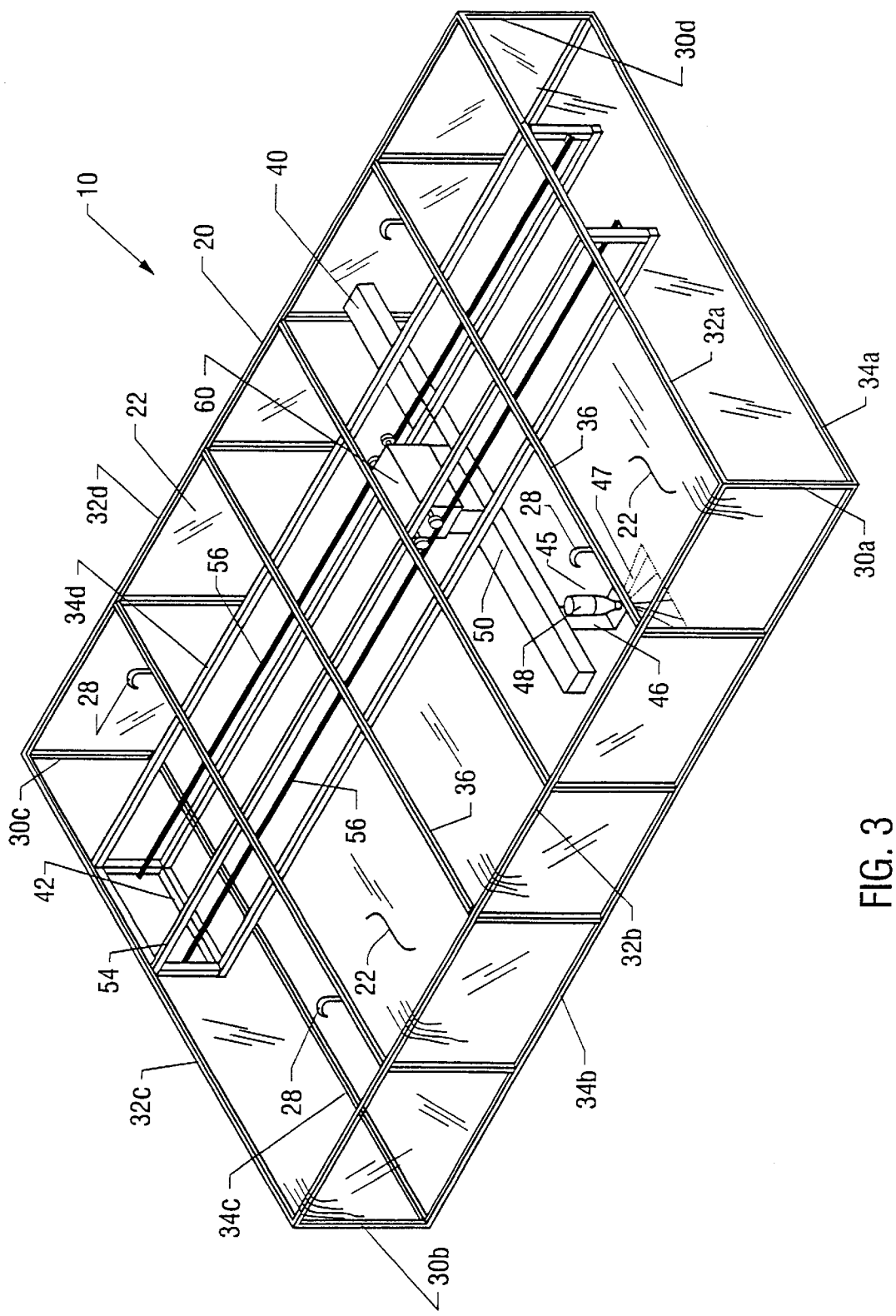
FIG. 3 is a perspective view of a rigid frame, a wind shield and a spray assembly movably mounted on a track assembly located inside an enclosed area defined by side panels of the wind shield.

FIG. 3 shows a wind shield 22 constructed of transparent material, together with frame 20 and some of the internal components of the spraying apparatus. The specific embodiment shown in this figure includes hooks 28 as alternative means for grasping and lifting the wind shield. However, as explained above, it is usually preferable to connect the frame 20 to a standard hitch such as a three-point hitch on a farm tractor (linkage not shown in FIG. 3). The frame 20 in this embodiment includes corner vertical members 30a–30d, top horizontal members 32a–32d, bottom horizontal members 34a–34d, and top struts 36 to provide additional rigidity to the structure.

Where the track assembly comprises a single track, this track is preferably medianly situated in the enclosed area and oriented parallel to the longer rather than the shorter sides of the wind shield. It can conveniently be attached, for example by bolts or welds, to the top horizontal members 32a and 32c and to the top struts 36 of the frame 20. The single track can comprise two parallel rails that can be engaged by wheels of the spray assembly, and a rigid support gantry which ensures the rails do not move relative to one another, potentially causing derailment or jamming of the spray assembly.

In the specific embodiment illustrated in FIG. 3, the track assembly comprises a first, or X-axis, track 42 medianly and fixedly mounted on the frame 20 and a second, or Y-axis, track 40 movably mounted on the X-axis track 42 and oriented perpendicularly thereto. This Y-axis track comprises a bar 50 having mounted movably thereon a spray assembly 45. The spray assembly includes a mounting bracket 46, a nozzle 47 and a reservoir 48.

Figure 4:
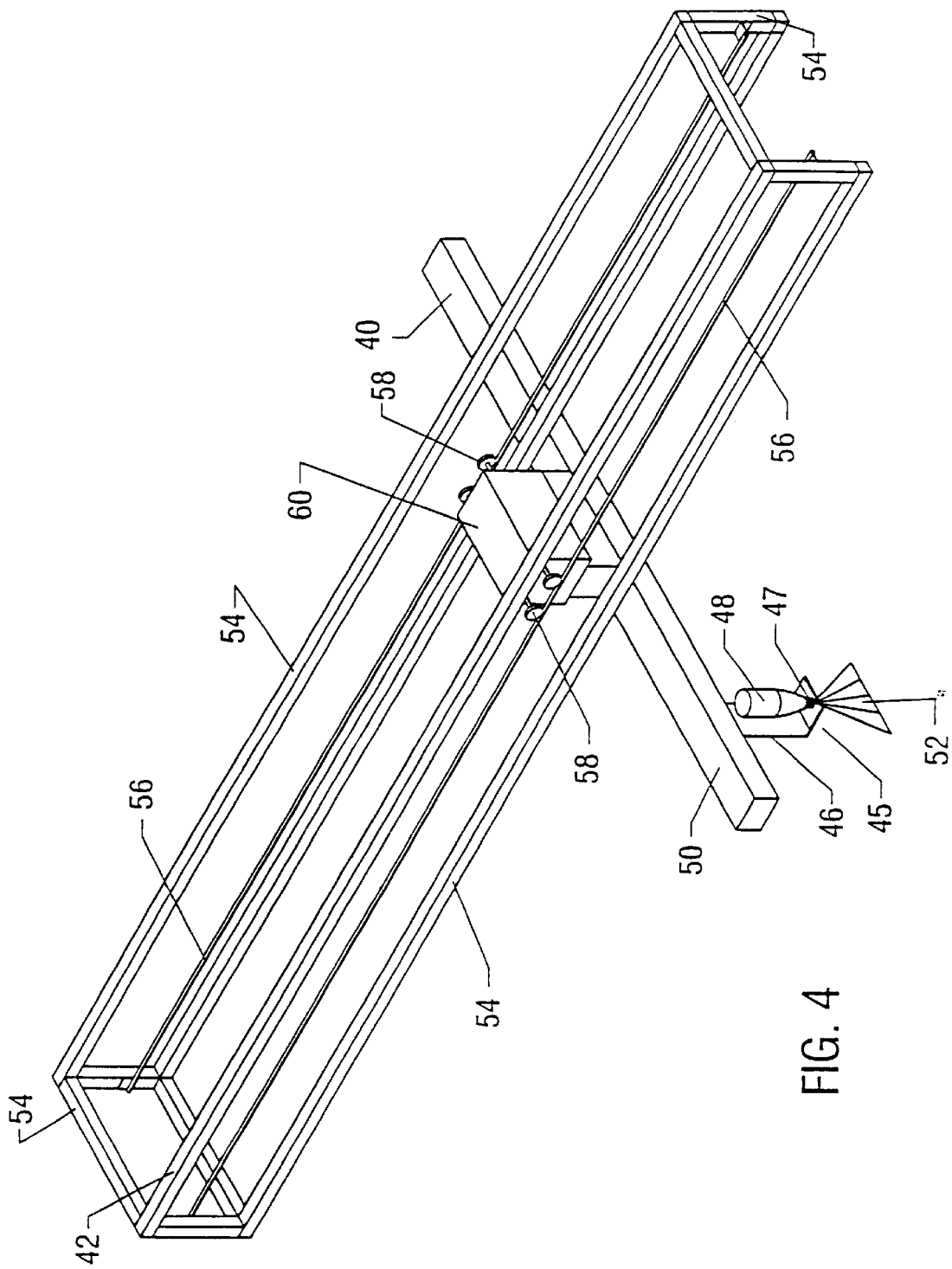
FIG. 4 is a perspective view of a track assembly and a spray assembly in accordance with the invention.

Turning to FIG. 4, which shows the Y-axis track 40 and the X-axis track 42 without showing the frame 20, the mounting bracket 46 is in this embodiment movably mounted on the underside of the bar 50 of the Y-axis track 40, so that the spray assembly 45, which includes the mounting bracket 46, nozzle 47 and reservoir 48, can be moved back and forth in the second direction, or Y-axis, within the area enclosed by the wind shield. Preferably this is accomplished by including a pair of rails on the underside of bar 50, with wheels (not shown) rotatably mounted at the top of the mounting bracket 46 movable on those rails. Pressure applied within the reservoir 48 causes a liquid spray composition therein to be emitted from the nozzle 47 in a spray pattern 52 downwardly on to soil or plants.

The X-axis track 42 of the embodiment illustrated in FIG. 4 includes a support gantry 54 which is fixedly attached to the frame 20 (not shown), for example by welds or bolts. Thus, in operation, the X-axis track remains stationary relative to the frame and wind shield. The support gantry 54 can optionally have support struts (not shown) to provide further rigidity. The X-axis track 42 also includes a pair of rails 56 which are fixedly mounted on the support gantry 54, at least at each end and preferably also at a plurality of points along their length. The rails 56 provide a path for wheels 58 which are rotatably mounted on a carriage 60 that is in turn fixedly attached to the Y-axis track 40, thereby permitting the Y-axis track 40 to move back and forth in the first direction, or X-axis. In this manner the spray assembly 45 can be moved in both the X- and Y-axes within the enclosure defined by the wind shield.

Figure 5:
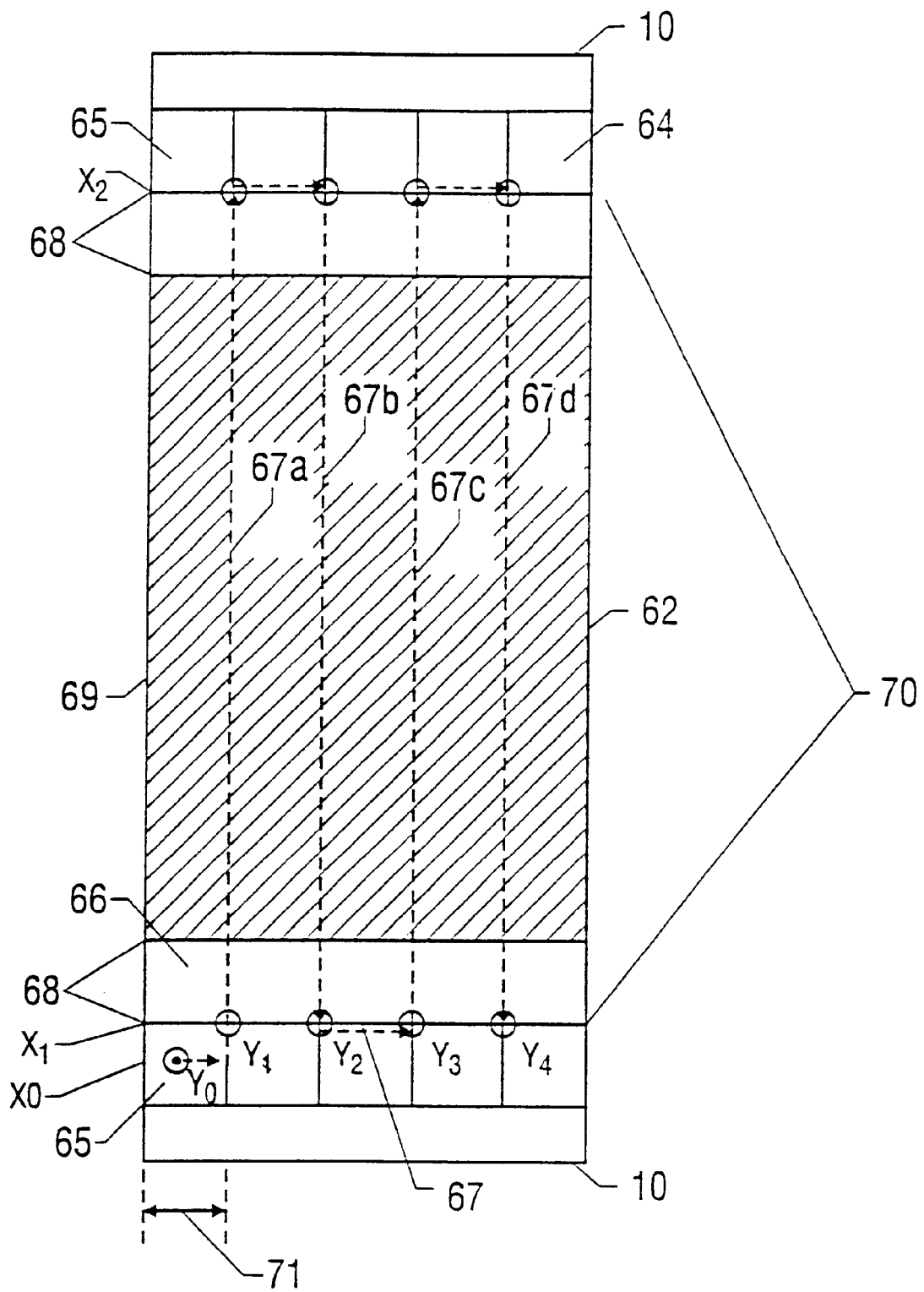
FIG. 5 is an overhead view of an area enclosed by the wind shield of a spray apparatus of the invention, the enclosed area comprising a plot to be sprayed.

An example of a suitable path for the movement of a single-nozzle spray assembly, in an embodiment of the invention having X-axis and Y-axis tracks, is shown in the overhead view of FIG. 5. A plot 62 to be sprayed is shown by the diagonal shading. The area 64 enclosed by the wind shield 22 is in this illustrative case larger than the plot, and includes additional end regions 65 and 66, one on each end of the plot 62. Within the area enclosed by the wind shield 22, the spray assembly is moved in a scan pattern that includes a series of parallel passes. For example, the spray assembly begins at the location marked by coordinates $X_0$, $Y_0$. When operation on a plot commences, the spray assembly is first moved by drive means on the Y-axis track to coordinates $X_0, Y_1$. Next, the Y-axis track carrying the spray assembly is moved by drive means on the X-axis track, so that the spray assembly proceeds first to coordinates $X_1, Y_1$ and thence to coordinates $X_2, Y_1$ at the opposite end of the plot 62. The spray assembly then moves on the Y-axis track to coordinates $X_2, Y_2$ before proceeding to coordinates $X_1, Y_2$ by movement of the Y-axis track on the X-axis track as before, but in the reverse direction. By continuing this scan pattern across the plot as indicated by arrows 67a–67d, and by activating the spray assembly during the time it is passing over the plot in the X-axis, the entire plot 62 is sprayed. After the scan pattern is completed, the spray assembly returns to the start coordinates $(X_0, Y_0)$. Table 1 gives a suitable example of the sequence of moves for the spray assembly. X location Y location

TABLE 1

| Move  | X location | Y location |
|-------|------------|------------|
| start | $X_0$      | $Y_0$      |
| 1     | $X_0$      | $Y_1$      |
| 2     | $X_1$      | $Y_1$      |
| 3     | $X_2$      | $Y_1$      |
| 4     | $X_2$      | $Y_2$      |
| 5     | $X_1$      | $Y_2$      |
| 6     | $X_1$      | $Y_3$      |
| 7     | $X_2$      | $Y_3$      |
| 8     | $X_2$      | $Y_4$      |
| 9     | $X_1$      | $Y_4$      |
| 10    | $X_1$      | $Y_0$      |
| 11    | $X_0$      | $Y_0$      |

Note that the spray assembly continues in the X-axis direction past the ends of the plot 62. In one method of operation, spraying continues throughout the entire travel time in the X-axis, thereby also spraying portions of end regions 65 and 66 to form buffer zones 68. In another method of operation, spraying is automatically started and stopped during travel in the X-axis so that only the plot 62 itself is sprayed. With either method of operation, as a result of this extended travel beyond the limits of the plot 62, the buffer zones 68 provide for acceleration and deceleration of the spray assembly. Thus, during the time the spray assembly is traveling in the X-axis over the plot 62 it is moving at substantially constant velocity across the plot, thereby enhancing uniformity of the rate of application of the spray composition.

As an example of suitable dimensions, the plot 62 can be 144 inches (3.66 m) long in the X-axis and 96 inches (2.44 m) wide in the Y-axis, the area 64 enclosed by the wind shield 22 can be 216 inches (5.49 m) long and 96 inches (2.44 m) wide, each buffer zone 68 can be 18 inches (0.46 m) long and 96 inches (2.44 m) wide, the length 70 of spray assembly travel in the X-axis can be 180 inches (4.57 m), the distance 71 between the long side panel 69 of the wind shield 22 and the line of the first pass 67a in the X-axis of the spray assembly can be 12 inches (0.30 m), and the distance between consecutive passes, for example 67a and 67b, in the X-axis can be 24 inches (0.61 m). This is consistent with the entire width of the plot being sprayed with non-overlapping spray patterns in consecutive passes, and with a spray pattern width of 24 inches (0.61 m).

In a preferred embodiment, the spray apparatus is arranged to spray only while the spray assembly is moving in the X-axis. In other words, in the particular embodiment illustrated in FIG. 5, while the spray assembly moves along segments 67a–67d of the scan pattern, an open valve (not shown) permits spraying to occur. At or before the moment when the spray assembly reaches the end of such a segment and starts to move in the Y-axis, the valve closes to stop spraying. The valve limiting spraying to the time when the spray assembly is traveling in the X-axis can be triggered by any suitable switching device located on the X-axis track, or can be set to open automatically when travel begins on a segment 67a–67d of the scan pattern and close automatically when travel is completed on such a segment. The valve itself can be in an airline providing pressure to the reservoir, or in the conduit for the spray composition leading from the reservoir to the nozzle of the spray assembly.

Figure 7:
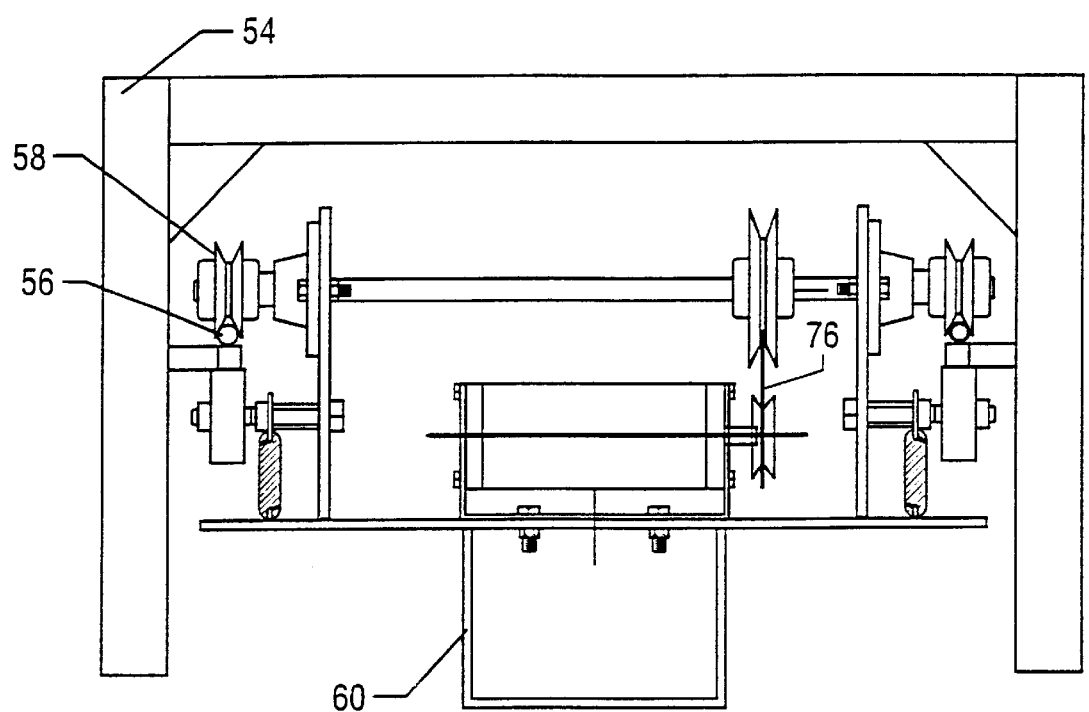
FIG. 7 is an end elevational view of a first track and carriage of a spray apparatus in accordance with the invention.

Drive means for moving the spray assembly 45 on the Y-axis track 40 and drive means for moving the Y-axis track on the X-axis track 42 can each take a number of forms. For example, an electric motor can be used to cause a chain or pulley to draw the carriage 60, which carries the Y-axis track 40, along the X-axis track 42, as shown in FIG. 7. The preferred drive means is a hydraulic or oil pressure operated system of a kind well known in the agricultural machinery art, which provides several desired characteristics. For instance, such a system provides a consistent controllable velocity. The system also provides for consistent, repeatable and accurate stops of the spray assembly. In addition, the system provides for high rates of acceleration and deceleration to maximize the portion of the total travel path of the spray assembly within which velocity is substantially constant.

Whether operated hydraulically or electrically, it is preferred that operation of the sprayer be robotic or controlled electronically, for example by means of a programmable computer. Control systems for the types of motion described herein are commercially available, as are control panels suitable for the present apparatus.

For an apparatus of the invention having a single track, drive means for movement of the spray assembly on the track can be as described above for movement of the carriage on the X-axis track.

Figure 12:
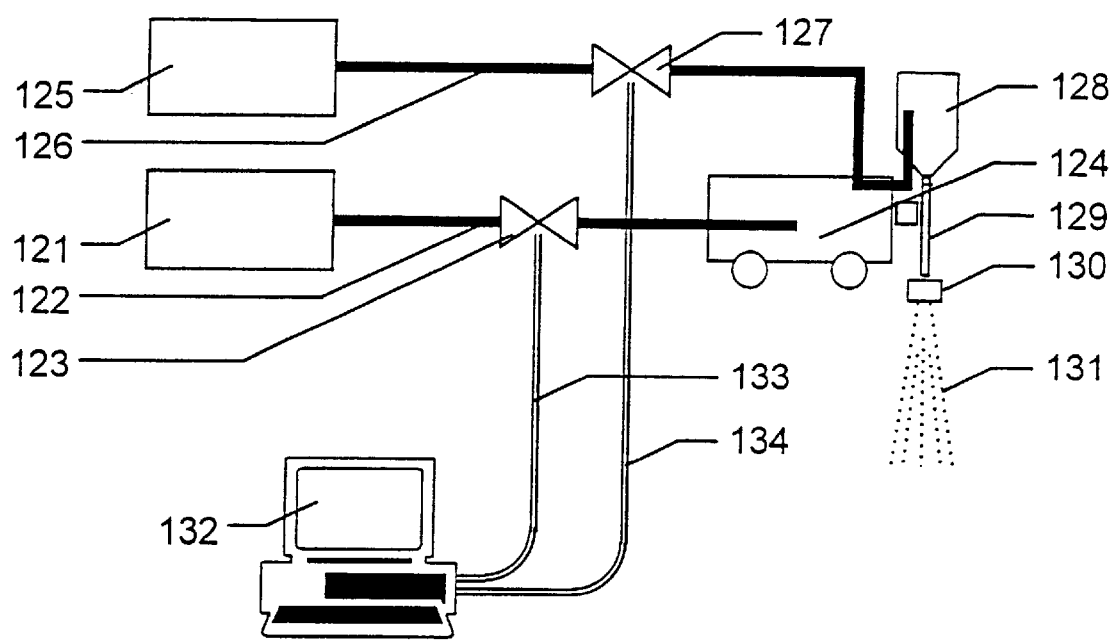
FIG. 12 is a schematic diagram of the operating system of a spray apparatus of the invention.

FIG. 12 shows, in schematic form, an operating system suitable for a spray apparatus of the invention. External drive means 121, which can be, for example, an electric generator or storage battery, or a hydraulic power generating system, provides power for movement of carriage 124 on the track assembly (not shown). Power is supplied from drive means 121 to carriage 124 by transmission means 122, which in the case of hydraulic power typically comprises a hydraulic pipe system containing oil, and in the case of electric power typically comprises electric cable connected to an electric motor situated in or on carriage 124. Transmission means 122 is provided with drive control means 123, which can comprise one or more valves or switches and is, in a preferred embodiment, operated by electronic signals transmitted along cable 133 from computer 132.

Also shown in FIG. 12 is the fluid propulsion means, typically comprising an external pressurizing means 125, such as a compressor or pre-pressurized gas cylinder, which feeds pressurized gas through airline 126 to reservoir 128 of the spray assembly. The pressurized gas propels a spray composition from reservoir 128 through conduit 129 to atomizing means 130, from which the spray composition emerges as a spray 131. A flow control means is provided in the form of controllable valve 127 located at a convenient point in airline 126; alternatively or supplementarily a flow control means is provided in the form of a controllable valve or shut-off in conduit 129 (not shown). The flow control means is, in a preferred embodiment, operated by electronic signals transmitted along cable 134 from computer 132.

Figure 8:
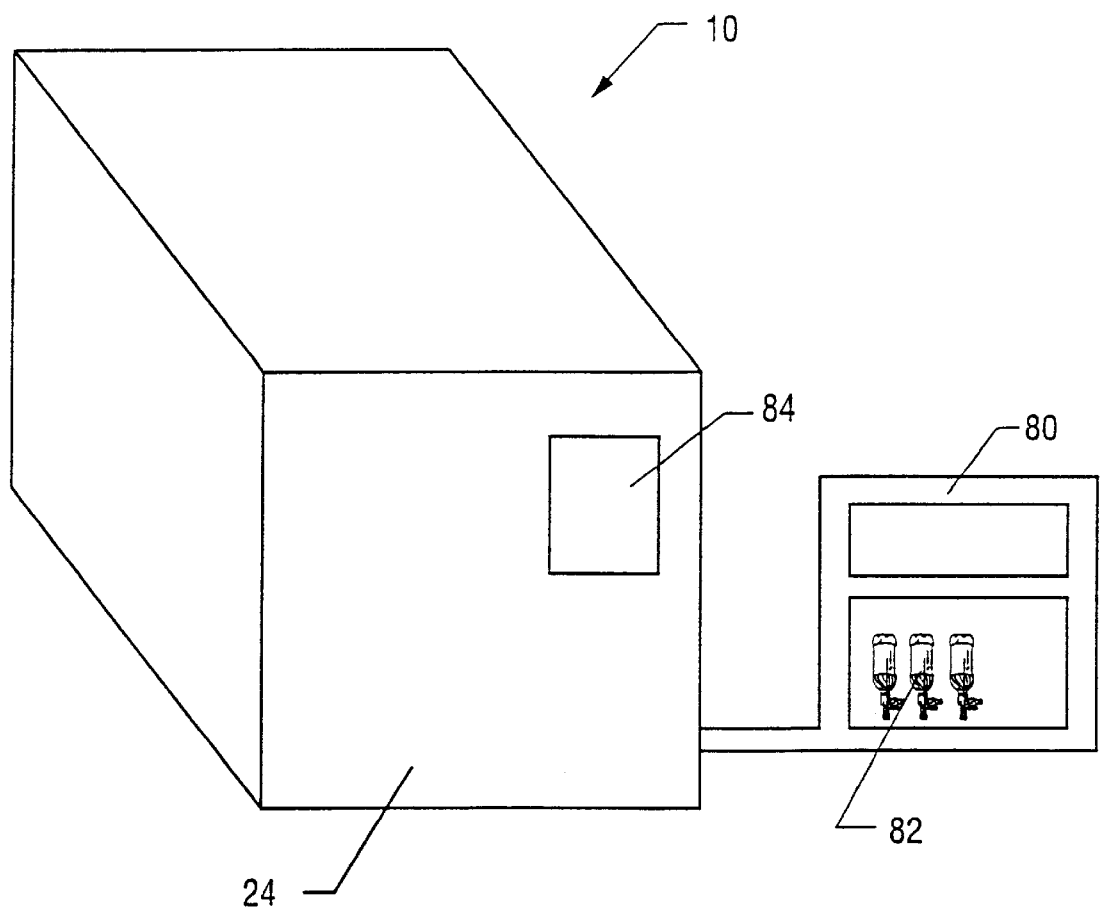
FIG. 8 is a perspective view of a wind shield having mounted thereon an external rack of spray bottles (replaceable reservoirs) in accordance with an embodiment of the invention.

In an agricultural research setting it is often useful to apply numerous spray compositions, each to a separate plot, so that the effects of the compositions on plants, or on plant diseases, pests or pathogens, can be compared. In order to facilitate the application of many spray compositions one after another to successive plots with minimum loss of time between applications and with minimum opportunity for error, the apparatus of the present invention can include a spray bottle rack. As shown in FIG. 8, in one embodiment the frame 20 has mounted on it an external rack 80 which can hold numerous spray bottles 82, each containing a liquid spray composition in an amount designed for application to a single entire plot. The rack is preferably positioned at the end of the apparatus proximal to the tractor, close to the operating controls for maximum convenience and efficiency of operation. Preferably the spray bottles form replaceable reservoirs 48 (of FIG. 6), but in an alternative embodiment the contents of each spray bottle are poured or drawn into a permanent reservoir.

A side panel 24 of the wind shield 10 preferably contains an aperture 84 to allow an operator to manually remove a spray bottle from the spray assembly inside the wind shield 10, select a new spray bottle 82 from the rack 80, insert the new bottle through the aperture 84, and connect the new bottle to the spray assembly. Most preferably, the aperture 84 is closeable, for example by means of a flap. Thus, a different spray composition can be applied to each plot on which the apparatus is successively placed, and a large number of plots can be sprayed in quick succession with a high degree of precision.

Figure 9:
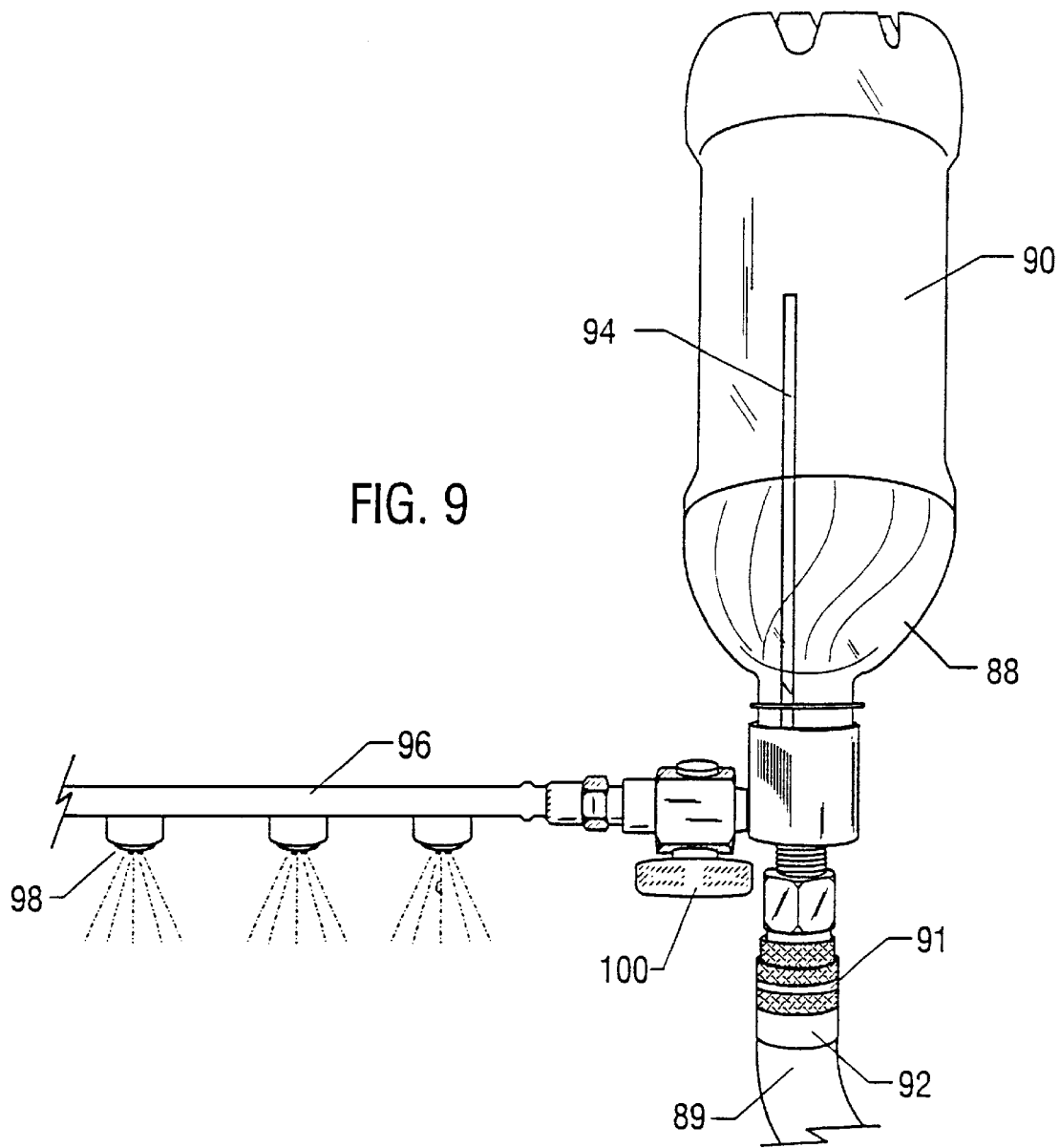
FIG. 9 is a side elevational view of a spray assembly of one embodiment of the invention.

FIG. 9 shows a portion of a spray assembly 88 of one embodiment of the invention in which pressurized gas, for example carbon dioxide at about 28 psig (193 kPa), is supplied from an airline 89 through a bottom fitting 92 attached to a coupling piece 91 into which the neck of the spray bottle 90 can be inserted and held in position, for example by a conventional screw fitting. The pressurized gas passes from the bottom fitting 92 through the coupling piece up into the upper part of the spray bottle or reservoir 90 via a tube 94, and forces the liquid spray composition out through a conduit in the coupling piece into a horizontal spray boom 96 attached to the coupling piece. From the spray boom 96 the liquid spray composition is released through one or more downward pointing nozzles 98. A valve 100 can be used to permit or stop flow of the spray composition into the boom 96.

One disadvantage of the spray assembly of FIG. 9 is that after the reservoir 90 is emptied, some of the spray composition will remain in the boom 96. If not completely ejected from the spray nozzles and boom, this remaining spray composition will contaminate the next spray composition used, and therefore may render the results of an experiment inaccurate (for example by causing a plot to receive a mixture of a first herbicide composition and a second herbicide composition when the researcher intended that plot to be treated only with the second herbicide composition).

Figure 10:
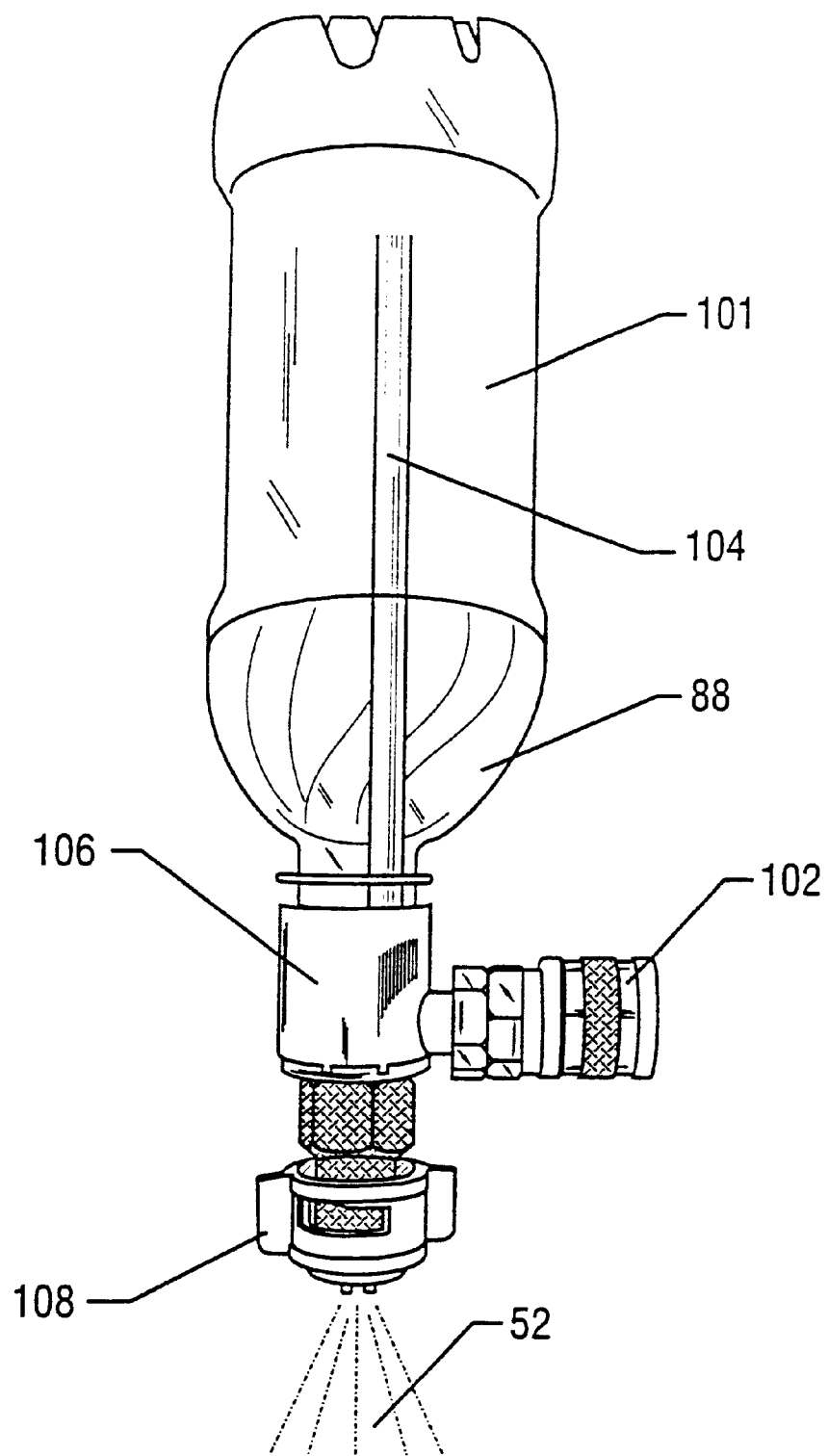
FIG. 10 is a side elevational view of an improved spray assembly in accordance with a preferred embodiment of the invention.
Figure 11:
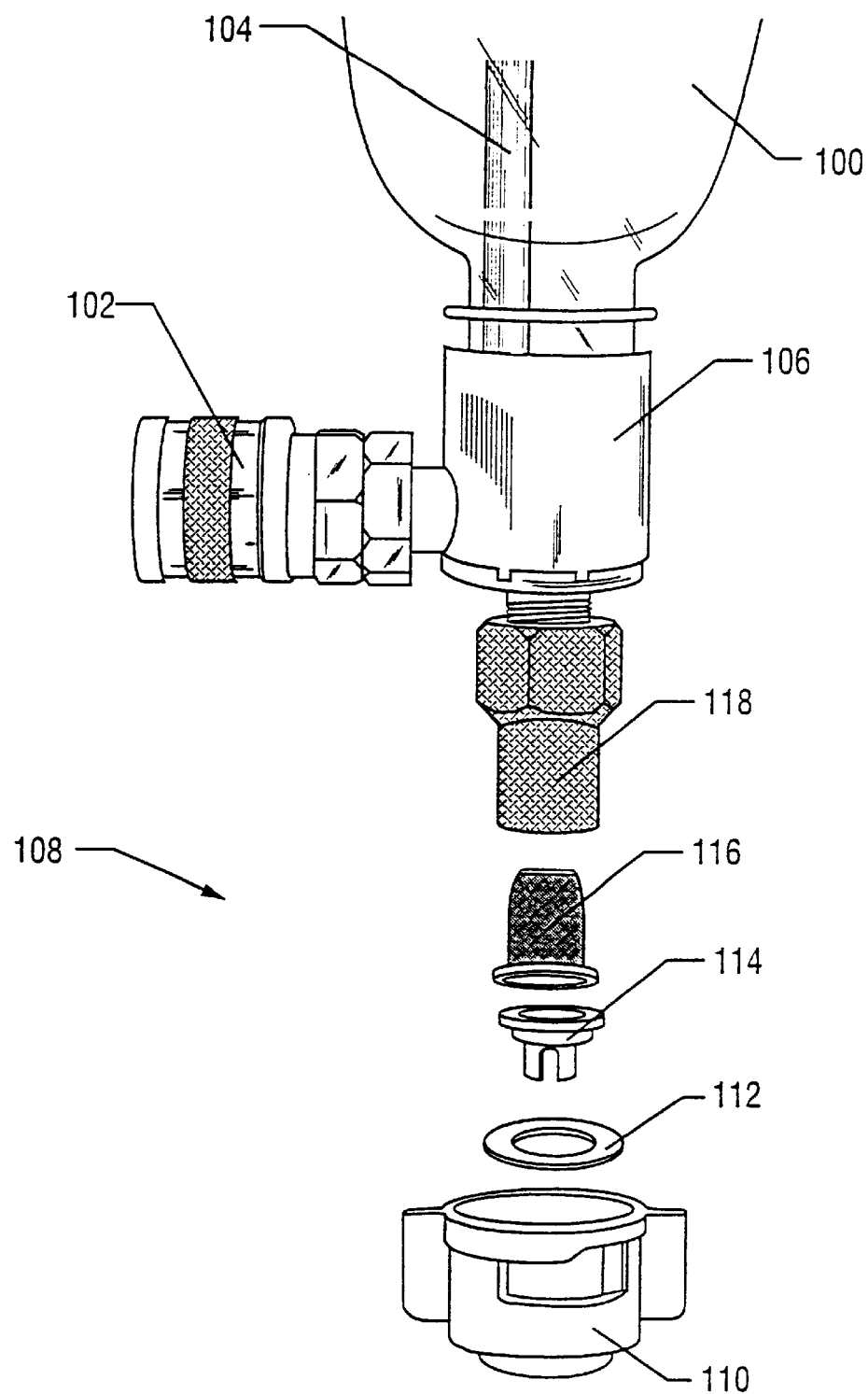
FIG. 11 is an exploded view of part of the spray assembly of FIG. 10.

FIG. 10 shows a portion of an improved spray assembly 88 for use in a preferred embodiment of the present invention. A female quick-connect fitting 102 extending to one side of a coupling piece 106 is adapted to receive pressurized gas from an airline such as a hose connected to a gas bottle, air compressor or other source (not shown). The pressurized gas passes into a tube 104 which carries the gas through the coupling piece 106 to the upper part of the spray bottle or reservoir 101. The gas pressure within the reservoir 101 forces the liquid spray composition contained therein down through the coupling piece 106 and a nozzle 108 attached directly to the bottom of the coupling piece. The nozzle atomizes the liquid spray composition and creates a downwardly-directed spray pattern 52. Each spray bottle on the rack 80 shown in FIG. 8 preferably comprises all of the assembly shown in FIG. 10. Therefore, when a first spray composition has been applied to a first plot from a first spray bottle, the spray apparatus can then be lifted and moved to a second plot, the first spray bottle can be manually removed by releasing the quick-connect fitting 102 from the airline, a second spray bottle containing a second spray composition can be selected from the rack 80, and it can then be attached to the airline, again by means of quick-connect fitting 102, so that the second spray composition can then be applied to the second plot.

The preferred embodiment of spray bottle 82 is shown in an exploded view in FIG. 11. In this view, the various components of nozzle 108 are shown as cap 110, seal gasket 112, spray tip 114, ball valve strainer 116, and nozzle body 118. The various components of nozzle 108 are commercially available, for example from Spraying Systems Co. of Wheaton, Ill.

Although in preferred embodiments the spray composition reservoir takes the form of a replaceable spray bottle such as that illustrated in FIG. 10 and is mounted integrally on the spray assembly as described above, the spray composition could alternatively be stored in a permanent reservoir not part of the spray assembly itself. For instance, the reservoir could be mounted in a fixed position, for example on the frame 20, and be connected to the spray assembly by a flexible conduit so that a connection is maintained during the entire travel of the spray assembly within the enclosure defined by wind shield 10.

Use of the shielded plot sprayer of the present invention has proved to be a significantly improved method of spraying research field plots by comparison with conventional prior art methods. One major advantage is improved precision of evaluation of biological effectiveness of test compositions on a variety of plant species. This improved precision takes the form of reduced variability in data derived from different test plots receiving the same treatment.

To illustrate this advantage of the invention, a field test was implemented on a farm in Illinois. Several annual broadleaf and grass species were planted in rows and were permitted to grow to a suitable plant growth stage for treatment with the post-emergence foliar applied herbicide glyphosate. Sufficiently uniform populations of six of these species established for evaluation of the herbicidal effectiveness of glyphosate. The six species were velvetleaf (*Abutilon theophrasti,* ABUTH), morningglory (Ipomoea sp., IPOSS), prickly sida (*Sida spinosa,* SIDSP), common waterhemp (*Amaranthus rudis,* AMATA), spring wheat (*Triticum aestivum,* TRZAS) and barnyardgrass (*Echinochloa crus-galli,* ECHCG). Plots were marked off in such a way that each plot extended over rows of all six species.

Eight herbicidal treatments were applied, one to a plot, in a replicated block experimental design with three replications of each treatment. A set of plots was left untreated as a control. The eight treatments consisted of applications of two commercial isopropylammonium glyphosate formulations, ACCORD® herbicide and ROUNDUP® ULTRA herbicide, both of Monsanto Company, each at four rates (0.14, 0.28, 0.56 and 1.12 kilograms glyphosate acid equivalent per hectare). ROUNDUP® ULTRA contains a surfactant and is designed to be used alone; ACCORD® herbicide contains no surfactant and is generally used with addition of a surfactant adjuvant in the spray tank. In the present study, however, no surfactant was added. All applications were made in a water volume of 93 liters per hectare.

The entire study was done four times in separate runs, with all runs being made concurrently one afternoon in August. At the time of spraying, air temperature was 23° C., relative humidity 75% and a light wind was blowing from a north-northwesterly direction at 11 km/h. This windspeed is not normally considered excessive for conducting field spray trials. In one run of the study, a spray apparatus of the invention, as illustrated in FIGS. 1, 3, 4, 6, 7, 8, 10 and 11 and described in passages of text herein referring to these Figures, was used for all treatments. In the other three runs, the treatments were applied by hand-held boom sprayers operated by three different field research technicians, all very experienced in conducting field tests such as the present study, and referred to herein as applicators 1, 2 and 3.

Twenty-six days after treatment (DAT), percent inhibition of all six species in all plots was evaluated independently by two experienced field research technicians. Percent inhibition is a visual measurement of herbicidal effectiveness by comparison with untreated plots, wherein a percent inhibition of 0% indicates no effect and a percent inhibition of 100% indicates that all plants of a particular species in a plot were completely dead. A percent inhibition of 85% or more is in most cases considered acceptable for commercial herbicide use.

Thus the data set gathered from this study includes a total of 288 data points (8 treatments×3 replicates×2 evaluators×6 species) for each of the four runs, one of which is illustrative of the present invention and the other three are illustrative of a standard method in the art. The data from each of the four runs were subjected to a separate analysis of variance. It is generally recognized in the art that analysis of variance of field data of the type generated in this study is of doubtful value as a means of establishing significance of differences among treatments, unless the data are subjected to an appropriate statistical transformation. This is because towards the top of the percent inhibition range, i.e., near 100%, within-treatment variances are normally much smaller than those in the middle or near the bottom of the range. For example, a highly effective herbicide treatment applied to a species in three replicate plots might give percent inhibition data of 92%, 95% and 97% respectively, while in the same field test a less effective treatment might give percent inhibition data of 40%, 60% and 72% respectively. "Least significant differences" established by analysis of variance of such data could lead to misleading conclusions, underestimating the significance of small differences in the commercial ($\geq 85\%$ inhibition) part of the range and overestimating the significance of larger differences in the middle or lower part of the range.

For the present purpose, however, analysis of variance was conducted not to attempt to discern differences among treatments but to establish the error variance in each of the four runs of the test. As the spread of data was similar in all four runs, no serious misinterpretation results from analysis of the untransformed data; therefore no transformation was done. "Error variance" as used herein is the mean square for error, derived from the error sum of squares divided by the number of degrees of freedom for error, in the present case 30. A large value of error variance indicates a high degree of variability from plot to plot within treatments; progressively lesser degrees of variability are indicated by values of error variance tending towards zero.

Table 2 shows the mean percent inhibition for all eight treatments in each run of the test, together with the error variance applying to that run.

described immediately above has been used to conduct a field experiment involving spray application of a $^{14}$C-radiolabelled herbicide to plants to measure uptake and translocation of the herbicide. In addition to the advantages of the apparatus in enhancing accuracy and uniformity of spray application, the enclosure formed by the wind shield ensures containment of the radiolabelled material and permits effective decontamination.

The preceding description of specific embodiments of the present invention is not intended to be a complete list of every possible embodiment of the invention. Persons skilled in this field will recognize that modifications can be made to the specific embodiments described here that would be within the scope of the present invention.

What is claimed is:

1. A mobile shielded plot sprayer comprising:
   a wind shield comprising a side wall that defines an enclosed area;
   a track assembly located within said enclosed area and supported on said wind shield;
   a spray assembly mounted on said track assembly and movable thereon in at least one horizontal direction relative to the wind shield, said spray assembly comprising at least one atomizer located within the enclosed area of the wind shield; and
   a reservoir for holding a liquid spray composition, the reservoir having an outlet disposed within the enclosed area of the wind shield, the reservoir outlet being connected to the spray assembly and operatively connected to said atomizer to supply the spray composition thereto;
   the reservoir being disposed within the enclosed area and mounted on the spray assembly for movement therewith.

TABLE 2

| | | percent inhibition, 26 DAT | | | | | | |
|---|---|---|---|---|---|---|---|---|
| | | ABUTH | IPOSS | SIDSP | AMATA | TRZAS | ECHCG | average |
| shielded sprayer of | mean | 60.92 | 47.85 | 64.67 | 79.35 | 95.31 | 86.94 | |
| the invention | error variance | 54.33 | 192.17 | 106.25 | 113.40 | 20.75 | 36.87 | 87.30 |
| hand-held sprayer | mean | 66.19 | 48.63 | 64.60 | 69.69 | 96.52 | 88.29 | |
| (applicator 1) | error variance | 104.24 | 209.09 | 109.43 | 109.14 | 14.80 | 44.95 | 98.61 |
| hand-held sprayer | mean | 60.25 | 45.35 | 57.17 | 63.29 | 95.96 | 86.27 | |
| (applicator 2) | error variance | 53.18 | 238.16 | 155.44 | 140.46 | 25.55 | 57.75 | 111.76 |
| hand-held sprayer | mean | 74.79 | 54.50 | 69.81 | 78.79 | 95.42 | 89.40 | |
| (applicator 3) | error variance | 88.70 | 275.16 | 177.65 | 114.61 | 47.08 | 77.68 | 130.15 |

It will be noted that use of the shielded sprayer of the invention provided the lowest error variance of the four runs of the test for three of the six species (IPOSS, SIDSP and ECHCG). For ABUTH, the shielded sprayer of the invention provided close to the lowest error variance; only applicator 2 gave marginally lower but applicators 1 and 3 gave much higher error variance. For AMATA, the shielded sprayer of the invention gave the second lowest error variance in the study, applicator 1 giving the lowest and applicator 3 coming close to matching the error variance of the shielded sprayer. For TRZAS, the shielded sprayer again came second to applicator 1, but both applicators 2 and 3 gave higher error variance. The average error variance across all six species shows the shielded sprayer of the invention clearly to give lower overall error variance than any of applicators 1, 2 or 3 using standard hand-held spraying equipment.

The above study illustrates a surprising advantage of use of the present apparatus over a conventional method of field plot spraying, under light wind conditions normally considered acceptable for such conventional method. The benefit of using the present apparatus will be considerably greater under more windy or turbulent conditions.

As a further illustration of the usefulness of the present apparatus, a shielded sprayer similar to that used in the study 2. The mobile shielded plot sprayer of claim 1 further comprising a plurality of hitching points on said wind shield for hitching the sprayer to a powered vehicle.

3. The mobile shielded plot sprayer of claim 2 in combination with a powered vehicle adapted for attachment to said hitching points, said powered vehicle being used for moving said sprayer.

4. The mobile shielded plot sprayer of claim 1, wherein said side wall of the wind shield comprises four substantially vertical, rectangular side panels connected to each other at approximately 90° angles so as to define a substantially rectangular enclosed area.

5. The mobile shielded plot sprayer of claim 4, wherein the wind shield further comprises a substantially horizontal top canopy which is connected to the side wall such that there are substantially no gaps between the top canopy and the side panels.

6. The mobile shielded plot sprayer of claim 5, wherein said side panels and top canopy are constructed of a lightweight transparent material.

7. The mobile shielded plot sprayer of claim 5, wherein at least one of said side panels or said top canopy is provided with an aperture large enough to permit insertion or removal of a spray reservoir when the wind shield is in position over a plot.

8. The mobile shielded plot sprayer of claim 1, wherein said atomizer comprises a hydraulic nozzle, and wherein said fluid propulsion mechanism feeds pressurized gas to said reservoir through an air line.

9. The mobile shielded plot sprayer of claim 1, wherein said track assembly comprises a single track mounted on said wind shield and located within said enclosed area, and wherein said spray assembly is movable along said track.

10. The mobile shielded plot sprayer of claim 1, wherein said track assembly comprises a first track mounted on said wind shield and a second track movably connected by a carriage to said first track, said first and second tracks being located within said enclosed area and positioned perpendicularly to each other, and wherein said spray assembly is movable along said second track and said second track is movable along said first track.

11. The mobile shielded plot sprayer of claim 10, wherein said spray assembly is movable in a scan pattern that includes a series of parallel passes across the enclosed area.

12. The mobile shielded plot sprayer of claim 1, wherein said spray assembly comprises a single hydraulic nozzle and said integral reservoir is connected to said nozzle by a rigid coupling piece having an internal conduit through which a spray composition can be fed from said reservoir to said nozzle, and wherein said reservoir is supplied with pressurized gas by an air line that passes through said coupling piece.

13. The mobile shielded plot sprayer of claim 1, wherein all aspects of motion and operation of the spray assembly are programmably controlled by a computer.

14. A mobile shielded plot sprayer comprising:
a wind shield comprising a side wall that defines an enclosed area;
a track assembly located within said enclosed area and supported on said wind shield, said track assembly comprising a first track mounted on said wind shield and a second track movably connected by a carriage to said first track, said first and second tracks being located within said enclosed area, said second track being movable along said first track;
a spray assembly mounted on said second track, said spray assembly comprising at least one atomizer located generally within the enclosed area of the wind shield;
a reservoir adapted to hold a liquid spray composition and operatively connected to said atomizer to supply the spray composition thereto;
the second track being movable on the first track and the spray assembly being movable on the second track whereby the spray assembly can be positioned in two horizontal directions within the wind shield.

15. The mobile shielded plot sprayer of claim 14, wherein the wind shield further comprises a substantially horizontal top canopy which is connected to the side wall.

16. The mobile shielded plot sprayer of claim 15, wherein the wind shield comprises a rigid frame and wherein said side panels and top canopy are constructed of a lightweight transparent material mounted on the rigid frame.

17. The mobile shielded plot sprayer of claim 15, wherein at least one of the side wall and top canopy of the wind shield is provided with an aperture large enough to permit insertion or removal of a spray reservoir when the wind shield is in position over a plot.

18. The mobile shielded plot sprayer of claim 14, wherein said atomizer comprises a hydraulic nozzle, and wherein the plot sprayer further comprises a fluid propulsion mechanism for feeding pressurized gas to said reservoir through an air line.

19. The mobile shielded plot sprayer of claim 14, wherein said spray assembly comprises a single hydraulic nozzle and an integral reservoir connected to said nozzle by a rigid coupling piece having an internal conduit through which a spray composition can be fed from said reservoir to said nozzle, and wherein said reservoir is supplied with pressurized gas by an air line that passes through said coupling piece.

20. The mobile shielded plot sprayer of claim 14, wherein all aspects of motion and operation of the spray assembly are programmably controlled by a computer.

21. The mobile shielded plot sprayer of claim 14 further comprising a plurality of hitching points on said wind shield for hitching the sprayer to a powered vehicle.

22. The mobile shielded plot sprayer of claim 14 in combination with a powered vehicle for moving said sprayer, the sprayer being mounted on the powered vehicle at said hitch points.

23. A mobile shielded plot sprayer comprising:

a wind shield comprising a side wall that defines an enclosed area, and a substantially horizontal top canopy which is connected to the side wall;

a track assembly located within said enclosed area and supported on said wind shield;

a spray assembly mounted on said track assembly and movable thereon in at least one horizontal direction relative to the wind shield, said spray assembly comprising at least one atomizer located within the enclosed area of the wind shield;

a reservoir, adapted to hold a liquid spray composition and operatively connected to said atomizer to supply the spray composition thereto;

a drive on said spray assembly for movement thereof on said track assembly;

a fluid propulsion mechanism, to effect spraying;

at least one of the side wall and top canopy of the wind shield being provided with an aperture large enough to permit insertion or removal of a spray reservoir when the wind shield is in position over a plot.

24. The mobile shielded plot sprayer of claim 23, wherein the wind shield comprises a rigid frame and wherein said side panels and top canopy are constructed of a lightweight transparent material mounted on the rigid frame.

25. The mobile shielded plot sprayer of claim 23, wherein said atomizer comprises a hydraulic nozzle, and wherein said fluid propulsion mechanism feeds pressurized gas to said reservoir through an air line.

26. The mobile shielded plot sprayer of claim 23, wherein said track assembly comprises a single track mounted on said wind shield and located within said enclosed area, and wherein said spray assembly is movable along said track.

27. The mobile shielded plot sprayer of claim 23, wherein said spray assembly comprises a single hydraulic nozzle and an integral reservoir connected to said nozzle by a rigid coupling piece having an internal conduit through which a spray composition can be fed from said reservoir to said nozzle, and wherein said reservoir is supplied with pressurized gas by an air line that passes through said coupling piece.

28. The mobile shielded plot sprayer of claim 23, wherein all aspects of motion and operation of the spray assembly are programmably controlled by a computer.

29. The mobile shielded plot sprayer of claim 23 further comprising a plurality of hitching points on said wind shield for hitching the sprayer to a powered vehicle.

30. The mobile shielded plot sprayer of claim 29 in combination with a powered vehicle adapted for attachment to said hitching points, said powered vehicle being used for moving said sprayer.

31. A mobile shielded plot sprayer comprising:
- a wind shield comprising four substantially vertical, rectangular side panels connected to each other at approximately 90° angles so as to define a substantially rectangular enclosed area, and a substantially horizontal top canopy which is connected to the side wall such that there are substantially no gaps between the top canopy and the side panels;
- a track assembly located within said enclosed area and supported on said wind shield;
- a spray assembly mounted on said track assembly and movable thereon in at least one horizontal direction relative to the wind shield, said spray assembly comprising at least one atomizer located within the enclosed area of the wind shield; and
- a reservoir for holding a liquid spray composition, the reservoir having an outlet disposed within the enclosed area of the wind shield, the reservoir outlet being connected to the spray assembly and operatively connected to said atomizer to supply the spray composition thereto;
- at least one of said side panels or said top canopy being provided with an aperture large enough to permit insertion or removal of a spray reservoir when the wind shield is in position over a plot.

32. A mobile shielded plot sprayer comprising:
- a wind shield comprising a side wall that defines an enclosed area;
- a track assembly located within said enclosed area and supported on said wind shield;
- a spray assembly mounted on said track assembly and movable thereon in at least one horizontal direction relative to the wind shield, said spray assembly comprising at least one atomizer located within the enclosed area of the wind shield; and
- a reservoir for holding a liquid spray composition, the reservoir having an outlet disposed within the enclosed area of the wind shield, the reservoir outlet being connected to the spray assembly and operatively connected to said atomizer to supply the spray composition thereto;
- said track assembly comprising a first track mounted on said wind shield and a second track movably connected by a carriage to said first track, said first and second tracks being located within said enclosed area and positioned perpendicularly to each other, and wherein said spray assembly is movable along said second track and said second track is movable along said first track.

33. The mobile shielded plot sprayer of claim 32, wherein said spray assembly is movable in a scan pattern that includes a series of parallel passes across the enclosed area.

34. A mobile shielded plot sprayer comprising:
- a wind shield comprising a side wall that defines an enclosed area;
- a track assembly located within said enclosed area and supported on said wind shield;
- a spray assembly mounted on said track assembly and movable thereon in at least one horizontal direction relative to the wind shield, said spray assembly comprising at least one atomizer located within the enclosed area of the wind shield; and
- a reservoir for holding a liquid spray composition, the reservoir having an outlet disposed within the enclosed area of the wind shield, the reservoir outlet being connected to the spray assembly and operatively connected to said atomizer to supply the spray composition thereto;
- wherein all aspects of motion and operation of the spray assembly are programmably controlled by a computer.

* * * * *